(12) United States Patent
Berton et al.

(10) Patent No.: US 11,431,910 B2
(45) Date of Patent: Aug. 30, 2022

(54) SYSTEM FOR CONTROLLING THE ZOOM OF A SET OF CAMERAS AND METHOD OF CONTROLLING A SET OF CAMERAS

(71) Applicant: GENETEC INC., St-Laurent (CA)

(72) Inventors: Alexandre Berton, Agnetz (FR); Christophe Fauconnet, Paris (FR)

( * ) Notice: Subject to any disclaimer, the term of this patent is extended or adjusted under 35 U.S.C. 154(b) by 0 days.

(21) Appl. No.: 16/561,926

(22) Filed: Sep. 5, 2019

(65) Prior Publication Data
US 2020/0382707 A1    Dec. 3, 2020

(30) Foreign Application Priority Data

Jun. 3, 2019    (FR) ........................................ 1905847

(51) Int. Cl.
*G06T 7/70*       (2017.01)
*H04N 5/232*     (2006.01)

(52) U.S. Cl.
CPC ........... *H04N 5/23296* (2013.01); *G06T 7/70* (2017.01); *H04N 5/23206* (2013.01); *G06T 2207/30232* (2013.01); *G06T 2207/30244* (2013.01)

(58) Field of Classification Search
CPC ...... H04N 5/232; H04N 5/23296; G06T 7/70; G06T 2207/30244; G06T 2207/30232
See application file for complete search history.

(56) References Cited

U.S. PATENT DOCUMENTS

| | | | |
|---|---|---|---|
| 5,355,163 A | 10/1994 | Tomitaka | |
| 6,888,565 B1* | 5/2005 | Tanaka | G08B 13/19645 348/207.1 |
| 7,794,396 B2 | 9/2010 | Abhishek et al. | |
| 8,253,797 B1 | 8/2012 | Fereydoun et al. | |
| 8,493,477 B2 | 7/2013 | Kubota | |
| 8,624,709 B2 | 1/2014 | Andrew et al. | |
| 8,634,000 B2 | 1/2014 | IshikaWa | |
| 9,565,400 B1* | 2/2017 | Curlander | G08B 25/08 |

(Continued)

FOREIGN PATENT DOCUMENTS

| | | |
|---|---|---|
| CN | 108141529 A | 6/2018 |
| JP | H-11308517 A | 11/1999 |

OTHER PUBLICATIONS

French application No. 1905847(FR) preliminary search report dated Feb. 14, 2020.

(Continued)

*Primary Examiner* — Dave Czekaj
*Assistant Examiner* — Berteau Joisil
(74) *Attorney, Agent, or Firm* — Anglehart et al.

(57) ABSTRACT

A method of controlling one or more z-cameras from a set of cameras to obtain image streams capturing an object of interest; it includes receiving position data and object data corresponding to the object of interest; determining a subset of the one or more z-cameras having a zone of potential coverage comprising the object of interest; computing the relative position of the object of interest with respect to the center of the field of view of the z-camera; computing a zoom factor calculated by determining a narrowest field of view angle of the z-camera that encompasses the object of interest; and generating transmission commands for the subset of the one or more z-cameras based on the computed zoom factor.

13 Claims, 8 Drawing Sheets

(56) References Cited

U.S. PATENT DOCUMENTS

| 9,661,232 B2 | 5/2017 | John et al. |
| 2011/0025902 A1 | 2/2011 | Vladimir et al. |
| 2011/0181716 A1* | 7/2011 | McLeod ................ H04N 7/181 |
| | | 348/143 |
| 2015/0116501 A1 | 4/2015 | Charles et al. |
| 2016/0073039 A1 | 3/2016 | Ken et al. |
| 2017/0085771 A1* | 3/2017 | Schwager .......... H04N 5/23212 |

OTHER PUBLICATIONS

French application No. 1905847(FR) written opinion with English summary and the related claims dated Feb. 14, 2020.

* cited by examiner

Camera Data Structure

→ Camera ID;
→ GPS Coordinates/Position of Camera;
→ Max Field of View;
→ Max Distance;
→ Height from Ground of Camera;
→ Pan ⎤
→ Tilt ⎦ or HFCV
→ Camera Model;
→ Camera Owner;
→ Special Permission for Camera;

FIG. 7

Object Data Structure

→ Source ID of Data;
→ GPS Coordinates of Object;
→ Object Type Identifier; and or
→ Object Dimensions;

SYSTEM FOR CONTROLLING THE ZOOM
OF A SET OF CAMERAS AND METHOD OF
CONTROLLING A SET OF CAMERAS

The present patent application claims priority from the French patent application No. FR 1905847 filed on Jun. 3, 2019, incorporated herein by reference.

TECHNICAL FIELD

The present disclosure relates to monitoring and surveillance, and more particularly to controlling a set of cameras including z-cameras such that they focus on an area of interest.

BACKGROUND

Security systems for certain sites may include a multitude of cameras and other sensors such as radars and LIDARs. When an object of interest, such as a car or person, enters the field covered by the security system, it would be advantageous to have all cameras of the security system capture the object of interest. As such, the user of the security system can gather additional information on the object of interest, which may assist, for instance, in identifying the vehicle or the person.

Moreover, it would also be advantageous to have the cameras that can cover the object of interest also undergo the necessary zooming to focus on the object of interest. One of the challenges experienced in current surveillance systems is that not all camera resources have PTZ (pan-tilt-zoom) capabilities. Without the ability to center an object of interest in the camera's field of view, zoom commands must take into consideration the offset of the object with regard to the center of the field of view, otherwise zooming in may only capture part of the object of interest. Therefore, it would be advantageous to have a surveillance system that can ensure complete coverage of an object of interest at optimal zoom levels, even when the object may not be centered in the camera's field of view.

Additionally, in current surveillance systems, once a user of a security system identifies the object of interest, the user has to manually zoom each of the relevant cameras on the object of interest. This exercise is time consuming, and during the time taken to perform these actions, there is a risk that the object of interest will leave its current position before the user can have the other cameras focus on the object.

As such, it would be advantageous to have a security system that can rapidly assess which cameras have an object of interest in their line-of-sight and further command all these relevant cameras to zoom to an optimal zoom level, with little or no human actions involved. It would also be advantageous to have the system be able to automatically capturing and recording all objects of interest that enter the area covered by the security system.

SUMMARY

The present disclosure relates to a system for controlling at least z-cameras of a set of cameras, where the system generates and transmits zoom commands for causing the z-cameras to zoom onto the object of interest.

The surveillance system receives information on an object of interest from an external device. The external device may be a radar, LIDAR, camera, another external device providing GPS coordinates, etc.

This information on the object includes position data on the object (e.g. GPS coordinates) and object data that can be processed by the system such that the system can obtain dimensions of the object. The object data may include the real-life dimensions of the object, or information on a type of object that is processed by the system to determine dimensions for the object.

The system then uses the position of the object of interest to identify which cameras can capture the object within its field of view.

Zoom commands are then generated for each z-camera such that the z-camera has the maximum zoom onto the object of interest while capturing the entirety of the object of interest. The system calculates the relative position of the center of the object of interest with respect to the position of the z-camera, which can be the angle between the center of the field of view and the lines defined by the position of the z-camera and the position of the center of the object of interest. The calculation of the relative position of the object of interest with respect to the z-camera is performed as the orientation (e.g. pan and tilt) of the z-camera is fixed due to the nature of the z-camera, where only the zoom of the z-camera can be adjusted.

A broad aspect is a method of controlling one or more z-cameras from a set of cameras to obtain image streams capturing an object of interest. The method includes receiving position data and object data corresponding to the object of interest, the position data related or relatable to a position of the object of interest and object data includes or is relatable to dimension information on the object of interest; determining from at least position data of the one or more z-cameras, the position data of the object of interest, the object data of the object of interest and an orientation of each of the one or more z-cameras, a subset of the one or more z-cameras having a zone of potential coverage comprising the object of interest; for each z-camera of the subset of the one or more z-cameras, computing the relative position of the object of interest with respect to the center of the field of view of the z-camera; for one or more z-cameras of the subset of the one or more z-cameras, computing a zoom factor calculated by determining a narrowest field of view angle of the z-camera that encompasses the object of interest as determined from at least the position data, the dimension information and the computed relative position of the object of interest; and generating transmission commands for the subset of the one or more z-cameras based on the computed zoom factor.

In some embodiments, the object data may include dimension information that defines the dimensions of the object of interest.

In some embodiments, the object data may be relatable to dimension information, the object data comprising object type information that is associated to pre-defined dimension information for the object type.

In some embodiments, the orientation of the each of the one of more z-cameras may include a pan and a tilt of the z-camera.

In some embodiments, the narrowest field of view angle of the z-camera may be determined from at least the position data, the dimension information, the computed relative position of the object of interest and the height of the camera from the ground.

In some embodiments, object margin information may be provided that defines object margins for the object of interest, and the narrowest field of view of the z-camera may be determined from at least the position data, the dimension information, the computed relative position of the object of interest and the object margin information, wherein the narrowest field of view angle may be a field of view angle that enables the z-camera to capture the object of interest and the object margins.

In some embodiments, the subset of the one or more z-cameras having a zone of potential coverage comprising the object of interest may be determined from at least the position data of the one or more z-cameras, the position data of the object of interest, the object data of the object of interest, the orientation of each of the one or more z-cameras and a maximum distance at which a camera can view an object.

In some embodiments, the position data may include GPS coordinates.

In some embodiments, the set of cameras may be cameras that are positioned within a given defined territory, the position data of each camera of the set of cameras verified to fall within the defined territory. For instance, a user may define the given territory on a virtual map appearing on a graphical user interface, where the delimitation of the virtual map may be converted to position data (GPS coordinates) defining the area for the purposes of the system establishing which cameras are located within the defined area.

In some embodiments, the determining a subset of the one or more z-cameras having a zone of potential coverage may include retrieving from memory, for each of the one or more z-cameras, the maximum field of view and the maximum distance of the each of the one or more z-cameras.

In some embodiments, the narrowest field of view angle may be determined from at least the distance of the one or more z-cameras of the subset of the one or more z-cameras to the object of interest based on the object data, the maximum field of view angle of the one or more z-cameras of the subset of the one or more z-cameras and the relative position of the of the object of interest with respect to the center of the field of view of the z-camera.

In some embodiments, the relative position of the object of interest with respect to the center of the field of view of the z-camera may be a value of an angle.

Another broad aspect is a system for controlling one or more z-cameras from a set of cameras to obtain image streams capturing an object of interest. The system includes memory to store data and instructions; a processor in communication with the memory; and a computer-readable camera zoom controlling application accessible via the memory and the processor, wherein the camera zoom controlling application is operable to: receive position data and object data corresponding to the object of interest, the position data related or relatable to a position of the object of interest and object data includes or is relatable to dimension information on the object of interest; determine from at least position data of the one or more z-cameras, the position data of the object of interest, the object data of the object of interest and an orientation of each of the one or more z-cameras, a subset of the one or more z-cameras having a zone of potential coverage comprising the object of interest; for each z-camera of the subset of the one or more z-cameras, compute the relative position of the object of interest with respect to the center of the field of view of the z-camera; for one or more z-cameras of the subset of the one or more z-cameras, compute a zoom factor calculated by determining a narrowest field of view angle of the z-camera that encompasses the object of interest as determined from at least the position data, the dimension information and the computed relative position of the object of interest; and generate transmission commands for the subset of the one or more z-cameras based on the computed zoom factor.

In some embodiments, the object data may include dimension information that defines the dimensions of the object of interest.

In some embodiments, the object data may be relatable to dimension information, the object data comprising object type information that is associated to pre-defined dimension information for the object type.

In some embodiments, the orientation of the each of the one of more z-cameras may include a pan and a tilt of the z-camera.

In some embodiments, the narrowest field of view angle of the z-camera may be determined from at least the position data, the dimension information, the computed relative position of the object of interest and the height of the camera from the ground.

In some embodiments, object margin information may be provided that defines object margins for the object of interest, and the camera zoom controlling application may be further operable to determine the narrowest field of view of the z-camera from at least the position data, the dimension information, the computed relative position of the object of interest and the object margin information, wherein the narrowest field of view angle may be a field of view angle that enables the z-camera to capture the object of interest and the object margins.

In some embodiments, the camera zoom controlling application may be further operable to determine the subset of the one or more z-cameras having a zone of potential coverage comprising the object of interest from at least the position data of the one or more z-cameras, the position data of the object of interest, the object data of the object of interest, the orientation of each of the one or more z-cameras and a maximum distance at which a camera can view an object.

In some embodiments, the position data may include GPS coordinates.

In some embodiments, the set of cameras may be cameras that are positioned within a given defined territory, the position data of each camera of the set of cameras verified to fall within the defined territory. For instance, a user may define the given territory on a virtual map appearing on a graphical user interface, where the delimitation of the virtual map may be converted to position data (GPS coordinates) defining the area for the purposes of the system establishing which cameras are located within the defined area.

In some embodiments, the camera zoom controlling application may be further operable to determine a subset of the one or more z-cameras having a zone of potential coverage may include retrieving from memory, for each of the one or more z-cameras, the maximum field of view and the maximum distance of the each of the one or more z-cameras.

In some embodiments, the camera zoom controlling application may be further operable to determine the narrowest field of view angle from at least the distance of the one or more z-cameras of the subset of the one or more z-cameras to the object of interest based on the object data, the maximum field of view angle of the one or more z-cameras of the subset of the one or more z-cameras and the relative position of the of the object of interest with respect to the center of the field of view of the z-camera.

In some embodiments, the relative position of the object of interest with respect to the center of the field of view of the z-camera may be a value of an angle.

Another broad aspect is a computer-readable medium storing instructions executable by a computer device, including at least one instruction for causing the computer device to receive position data and object data corresponding to the object of interest, the position data related or relatable to a position of the object of interest and object data includes or is relatable to dimension information on the object of interest; at least one instruction for causing the computer device to determine from at least position data of the one or more z-cameras, the position data of the object of interest, the object data of the object of interest and an orientation of each of the one or more z-cameras, a subset of the one or more z-cameras having a zone of potential coverage comprising the object of interest; at least one instruction for causing the computer device to, for each z-camera of the subset of the one or more z-cameras, compute the relative position of the object of interest with respect to the center of the field of view of the z-camera; at least one instruction for causing the computer device to, for one or more z-cameras of the subset of the one or more z-cameras, compute a zoom factor calculated by determining a narrowest field of view angle of the z-camera that encompasses the object of interest as determined from at least the position data, the dimension information and the computed relative position of the object of interest; and at least one instruction for causing the computer device to generate transmission commands for the subset of the one or more z-cameras based on the computed zoom factor.

BRIEF DESCRIPTION OF THE DRAWINGS

The invention will be better understood by way of the following detailed description of embodiments of the invention with reference to the appended drawings, in which.

DETAILED DESCRIPTION

Aspects of the present disclosure provide systems and methods for controlling a set of cameras such that certain cameras focus on an object of interest by adjusting, when need be, the zoom parameter of one or more cameras that are positioned and capable to capture the object of interest.

In the present disclosure, by "field of view", it is meant the open observable area that can be captured by a camera.

In the present disclosure, by "z-camera" it is meant a camera with an adjustable zoom, but without an adjustable pan and tilt (where the pan and tilt are fixed).

Figure 1:
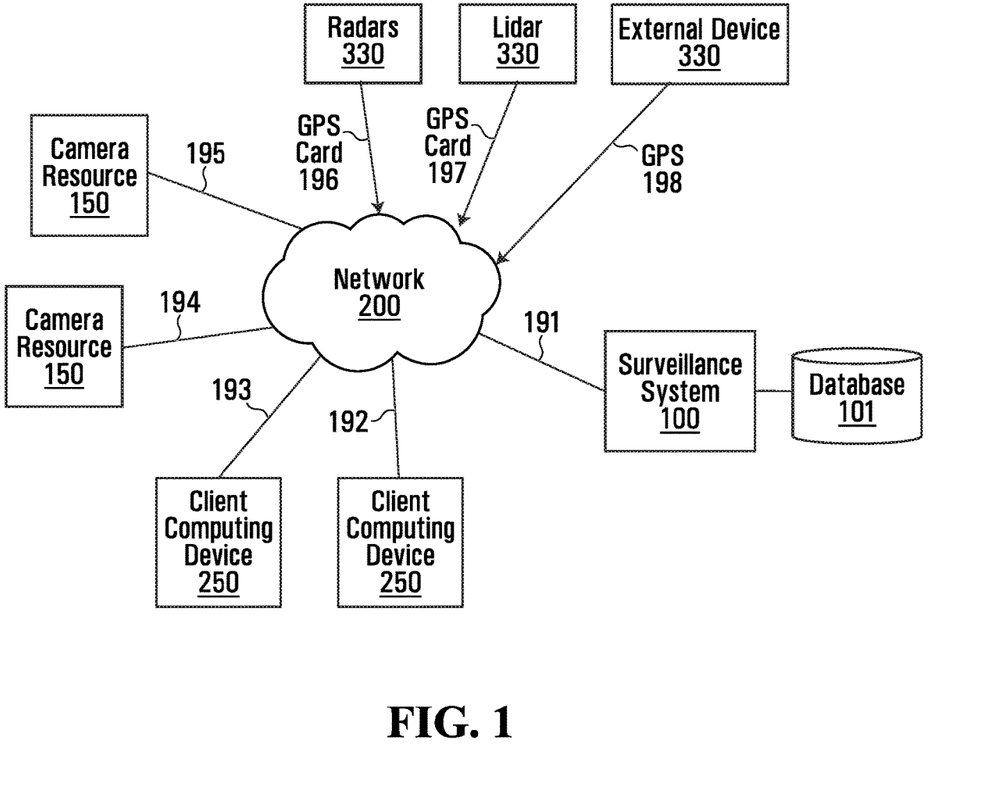
FIG. 1 is a block diagram of an exemplary security architecture with a camera control system.

Exemplary System Architecture:

Reference is made to FIG. 1, illustrating an exemplary architecture with an exemplary system for controlling cameras 100 that is configured to ensure coverage of an object of interest being identified by external devices that communicate with the system 100.

The system 100 is first configured to receive information from an external device 330 with which the system 100 is adapted to communicate (e.g. through application programming interfaces—APIs). For instance, a radar may transmit the coordinates of an object of interest, and in some examples its dimension information, to the system 100.

The system 100 is then configured to generate and transmit zoom commands to cameras that can capture the object of interest, the system 100 adjusting the zoom of the cameras such that the cameras focus on the object of interest without losing a part of the object of interest that appears in the image.

The image streams of the cameras with the adjusted zoom are sent to a user on a computing device 250 of a user, now capable of viewing one or more image streams from the one or more cameras that are homed on the object of interest.

For instance, a radar may pick up information on a car committing an infraction. The radar is adapted to generate GPS coordinates for the vehicle's position. The radar may also be further adapted to identify the dimensions of the vehicle, or at least identify the vehicle type, or retrieve information on the vehicle dimensions. In other examples, a user may indicate the object type (e.g. in this example, a car) manually from the user's computer.

The radar transmits the object information to the system 100. The system 100 receives the information on the object, e.g., that the object is a car and has the GPS coordinates provided by the radar. The system 100 selects the cameras within a region surrounding the car of interest that can capture the car. The system 100 then generates zoom commands for those cameras that can capture the car of interest as explained herein. The system 100 then transmits the zoom commands to the cameras such that the cameras will zoom onto the car, while capturing the entirety of the car. The system 100 may also be adapted to generate zoom commands that provide for a margin that frames the object of interest (providing contextual information). The cameras transmit the image stream, now zoomed onto the car of interest, to the computing device for viewing by the user.

It will be understood that even though the system described herein generates zoom commands, the system may also generate pan or tilt commands when controlling PT, PZ, TZ, or PTZ cameras, the pan and/or tilt commands generated as is known in the art.

The exemplary architecture of FIG. 1 includes the system for controlling cameras 100, a network 200, one or more client computing devices 250 for users, one or more camera resources 150 and one or more external devices 330. The architecture may also include one or more databases 101.

The surveillance system 100 can send commands to camera resources 150 in response to the receipt of information on an object of interest that was transmitted from one of the external devices 330. Cameras 150 that can capture the object of interest are then selected by the system 100, and zoom commands are generated and transmitted by the system 100 to the cameras such that the cameras are directed to adjust the zoom (zoom in, zoom out) such that the camera captures the object of interest.

The network 200 allows the exchange of data and control commands between the components of the exemplary architecture. An exemplary network 200 may include a wired network or a wireless network, such as a local area network, the internet, etc.

The camera resources 150 of the architecture include at least one z-camera, but may include other cameras such as a PZ-camera, a TZ-camera, a PTZ camera. However, it will be understood that the cameras that can receive zoom commands transmitted by the system 100 have at least an adjustable zoom.

The external devices 330 include radar, LIDAR, cameras, license plate readers, another external device providing GPS coordinates, etc. The external device 330 captures information on an object of interest such as the position of the object (e.g. GPS coordinates) and transmits information on the object of interest to the system 100. Depending on the configuration of the external device 300, the external device 330 also captures other information on the object of interest that is not sent to the system 100 (e.g. in the case of a LPR, the license plate information may not be sent to the system 100).

The system 100 communicates with the database 101 to retrieve data from the database 101 used by the system for selecting the cameras that can capture the object of interest and for generating the zoom commands.

Figure 7:
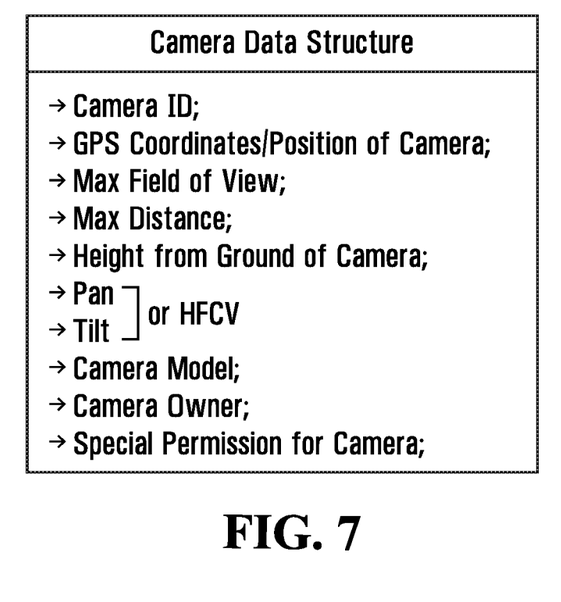
FIG. 7 is a representation of an exemplary camera data structure from an exemplary camera database of an exemplary security system.

For instance, the database 101 may include memory that stores data related to the positioning of the camera resources 150 (e.g. GPS coordinates of each of the camera resources). For instance, for each camera resource 150 that is controllable by the system 100, the database 101 may store an exemplary camera data structure with, e.g., the values defined in FIG. 7.

The database 101 may also include data on different types of objects that can be picked up by the external devices 330. For instance, the object data stored in database 101 may include dimension information for different object types that can be processed by the system 100 for generating the zoom commands as explained herein.

In some examples, the database 101 may be an external database.

In some embodiments, the system 100 of the exemplary architecture may be provided with all the required parameters to perform its calculations (e.g. camera resources sending their GPS coordinates, radars sending the object of interest dimensions, etc.) and thus the surveillance system 100 may not require any database 101.

The client computing devices 250 are computers that allow a user to receive image streams from the camera resources 150. In some examples, a user may send certain configuration data to the system 100, such as the value of the context margin as explained herein. Exemplary computing devices 250 may include, but are not limited to a desktop computer, a mobile device, a laptop, a tablet, a smartphone, a handheld computer, etc. The client computing device 250 may also include data storage devices in which the data stream of the controllable camera devices 150 is recorded for subsequent storage and analysis.

In the exemplary architecture of FIG. 1, there may be one or more external devices 330 capable of identifying an object of interest and its geographical coordinates, communicating with the surveillance system 100 through a link. For instance, there may also be one or more LIDARs and/or radars providing the same function and communicating with the surveillance system 100 through links 197 and 196 and the network 200.

There may be any number of each of the radar 310, LIDAR 320 and external device 330 providing the surveillance system 100 with the position data of the object of interest and its properties. These external devices 330 may provide precise dimensions of the object of interest and/or an identification of the type of object that may be used in a further query to an object database to approximate the object's dimensions.

In the embodiment of FIG. 1, two camera resources 150 (e.g. the cameras of a security system) are shown in communication with the network 200 through links 194, 195. It will be understood that any number of camera resources 150 may be used for the security system 100. These camera resources 150 are controllable by the surveillance system 100.

It will be understood that the communication links 191-198 between the components and the network 200 may be implemented in any manner, such as wirelessly, wired or a combination of both.

Figure 2:
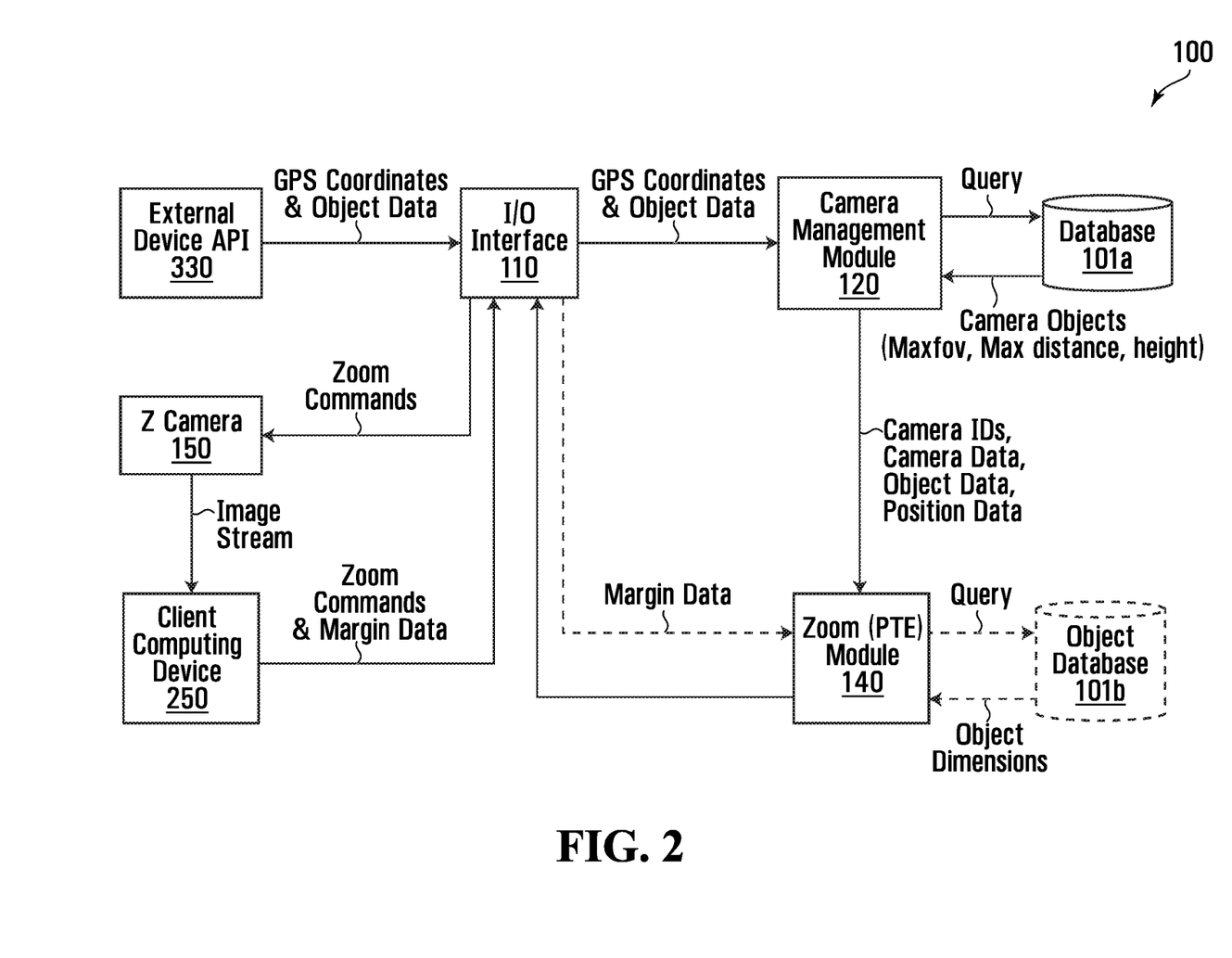
FIG. 2 is a block diagram of an exemplary camera control system controlling the cameras of the security system.

Exemplary System to Control Cameras 100:

Reference is now made to FIG. 2, illustrating an exemplary surveillance system 100 for controlling camera resources 150, namely one or more z-cameras.

The system 100 comprises an input/output interface 110 to allow communication with the external components of the security architecture, a camera management module 120, a zoom module 140 and one or more databases for storing information on the cameras 101*a* and the objects 101*b*.

The input/output interface 110 is connected or connectable to the network 200 and receives object of interest information (e.g. GPS coordinates, object identification, object dimensions, etc.) from the application programming interface (API) of one or more of the external device 330. In some examples, as the system 100 may receive different forms of data structures from different kinds of external devices 330, the input/output interface 110, or a software module of the system 100, may be configured to parse the incoming data such that it is processable by the system 100. For instance, the system 100 may include different drivers for communicating with different external devices 330. The drivers of the system 100 may communicate with the external devices 330 through different protocols, and converted incoming data into the format of the system 100.

The information on the object of interest received as data from an external device, that may be converted by the system 100 into its own format, may at least include:
  position data of the object of interest that may be:
    GPS coordinates of the object of interest; or
    position data of the external device 330 that has identified the object of interest, where the system 100 may use the position data of the external device 330, and in some examples, the orientation of the external device 330, to determine the position (e.g. calculate the GPS coordinates) of the object of interest;
  object data that can be used by the system to obtain the dimension information of the object of interest. For instance, the object data may include values for the x, y and z dimensions (or simply width and length) of the object, or may include a label associated with the object type (e.g. a car, a motorcycle, a truck, a person, etc.)

Figure 8:
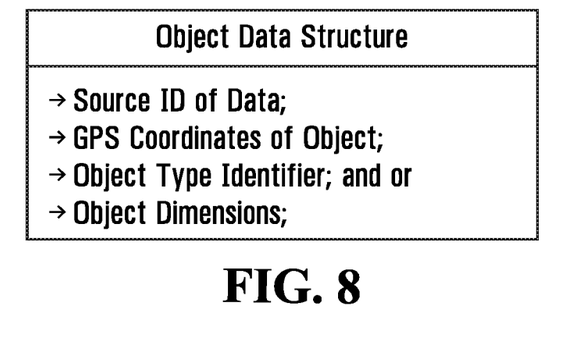
FIG. 8 is a representation of an exemplary object data structure from an exemplary external device.

An exemplary data structure on an object of interest received from an external device 330 by the I/O interface 110 is shown at FIG. 8. The object data structure may be generated by and transmitted from the external device 330, such as from as a radar, a LIDAR or another external device capable of generating position data of an object of interest. An exemplary object data structure may include, but is not limited to, the following object information:

source ID of data (ID of the external device generating the data);
 position data of the object of interest (e.g. GPS coordinates of the object of interest);
 object type identifier (a value that, when processed by the system 100, before or after decoding by the system 100, is used by the system to retrieve dimension values for the object of interest); and/or
 values defining the dimensions of the object of interest.

The input/output interface 110 transmits the received information to the camera management module 120 which may query a camera database 101a to receive detailed information on each camera resource 150 of the security architecture. The camera management module 120 may otherwise receive the required information directly from each camera through the input/output interface 110. An exemplary representation of the content of the camera resource 150 data structure may be found at FIG. 7.

The camera management module 120 includes program code stored in memory of the system 100, that, when executed by the processor of the system 100, causes the system 100 to select a subset of cameras within a set of cameras that can capture the object of interest within the field of view of the camera. The camera management module 120 may further cause the system 100 to generate and transmit a query to a camera database 101a that stores information on the camera resources 250. Upon receipt of the camera information from the database 101a, the camera management module 120, from the camera information, identifies the subset of cameras that can capture the object of interest within the field of view of the camera, as explained herein.

The camera management module 120 transmits the information and/or the identification information of the subset of cameras, and the object data and the position data of the object of interest to the zoom module 140.

The zoom module 140 includes program code stored in memory of the system 100, that, when executed by the processor of the system 100, causes the system 100 to calculate the relative position of the object of interest with respect of each camera of the subset of cameras, and to generate the zoom commands for each camera of the subset of cameras as a function of the information on the object of interest. The zoom module 140 further causes the system 100 to transmit the zoom commands to the camera resources 150 via the I/O interface 110, transmitted via network 200.

In some examples where the object information provided by the external device 330 does not include dimension information on the object of interest but only an identifier on the type of the object of interest, the zoom module 140 may further include program code that causes the system 100 to generate and transmit a query to database 101b that stores data on different object types. The query may include a label of the object type of the object of interest, the query retrieving from the database 101b predefined values for the dimensions of an object corresponding to the object type. For instance, if the object type, as provided in the label of the query, is a "truck", the approximate height, length and width of a typical "truck" may be retrieved by the database. As such, storing such values may allow system 100, executing the program code of the zoom module 140, to calculate the zoom factor despite the external device 330 not providing dimensions of the object of interest.

Once the zoom commands are received by the camera resource 150, the camera resource 150 performs the corresponding adjustment to its zoom. The image stream, with the adjusted zoom, is sent to the client computing device 250, the user receiving on the client computing device 250 the image stream with the zoom of the camera adjusted such that it captures a larger view of the object of interest, despite the object of interest not necessarily being centered with respect to the field of view of the camera, as the camera may not possess a pan and/or tilt functionality.

Figure 3:
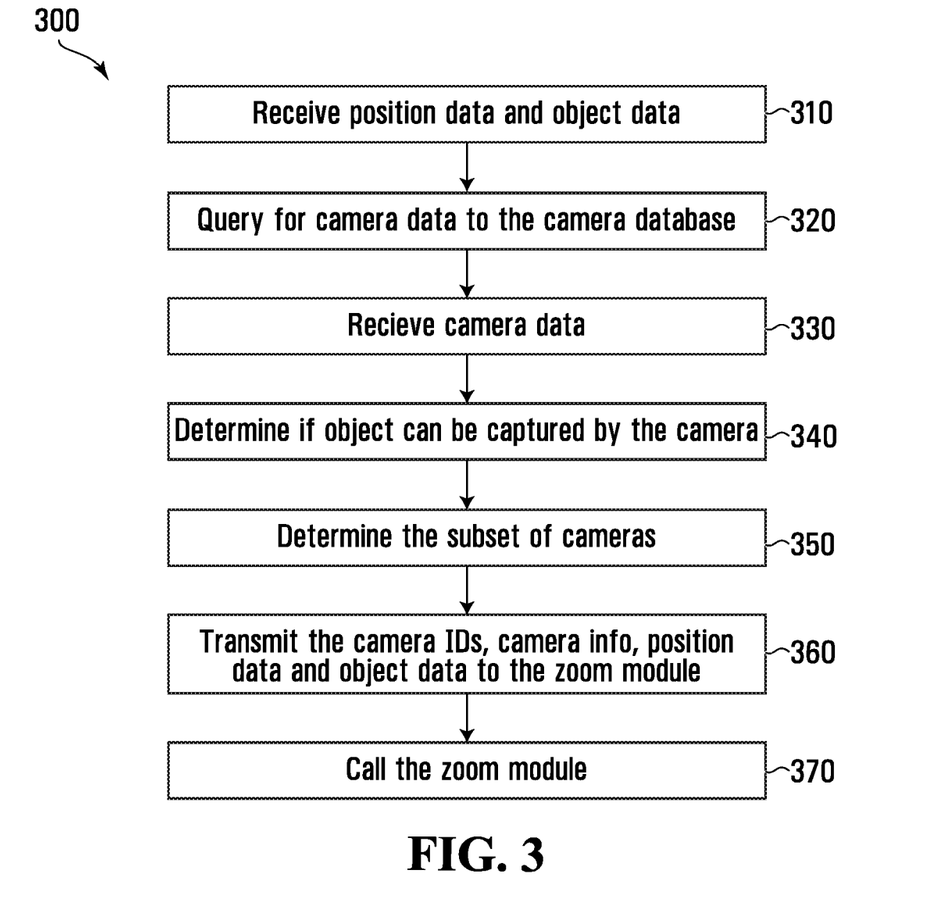
FIG. 3 is a flowchart diagram of an exemplary set of steps of obtaining object dimension data carried out by an exemplary zoom module stored in memory and executed by a processor of an exemplary surveillance system.

The Camera Management Module 120:

Reference is now made to FIG. 3, illustrating an exemplary set of steps 300 carried out by the program code of a camera management module (e.g. camera management module 120) when executed by a processor of the system 100. For purposes of illustration, reference will be made to the camera management module 120 of the system 100 of FIG. 2.

The camera management module 120 selects a subset of one or more cameras that can capture the object of interest. The selection is performed as a function of the properties of the cameras stored as values in an internal or external database 101a. Such properties may include the maximum field of view of the camera (when the camera is zoomed out at its maximum), the maximum distance from the camera at which the camera can capture an object, the height of the camera with respect to the ground, and the orientation of the camera. When the camera is a z-camera and does not possess a pan and/or tilt function, the pan and/or tilt of the z-camera cannot be controlled remotely and is therefore fixed. As such, the camera management module 120 determines if the z-camera is oriented in the proper direction to capture the object of interest.

The camera management module 120 receives object information on the object of interest from the I/O interface 110 at step 310. The object information may be in the form of a data structure and may include position data and object data of the object of interest.

The position data includes the position of the object of interest in real-space (e.g. the GPS coordinates).

The object data includes information that includes or is relatable to the dimension information of the object of interest. For instance, the object data may include values for the x, y and z dimensions (or simply width and length) of the object, or may include a label associated with the object type (e.g. a car, a motorcycle, a truck, a person, etc.) that is relatable to predefined default dimension values of an object of interest of the given object type.

To proceed with the identification of such cameras, the camera management module 120 may query the camera database 101a to receive detailed information on cameras of controllable by the security system 100 at step 320.

In some examples, the system 100 may be configured to only focus on cameras that are within a given region that can be defined by, e.g., a user on a, e.g., virtual map, or within a certain distance from the position of the object of interest as defined by the position data of the object of interest.

The camera management module 120 receives, at step 330, the information and characteristics of each camera 303, such as camera ID, geographical position, maximum field of view, maximum depth, height, pan, tilt, etc. For instance, the camera management module 120 may retrieve from database 101a a camera data structure that corresponds to a given camera that is controllable by the system 100. An exemplary camera data structure is detailed in FIG. 7, and may include, for instance, but is not limited to:
Camera ID;
position of the camera (e.g. GPS coordinates of the camera);
Maximum field of view;
Maximum distance;
Height from the ground at which the camera is installed;
Pan;
Tilt;
Camera model;
Camera name; and
Special permissions of camera (e.g. access rights, etc.).

In some examples, the camera information may not be queried from a database such as database 101a, but may instead be construed directly from the camera resource 150.

The camera management module 120 then determines which of the cameras of the set of cameras can capture the object of interest at step 340. The camera management module 120 determines which of the cameras has a maximum field of view that includes the object of interest. The camera management module 120 may also further select the cameras based on the maximum distance values of the camera, indicative of the maximum distance from the camera at which the camera may pick up an object.

In some examples, obstacles such as walls may be factored in by the camera management module 120 to assess if the field of view of the camera is affected by the obstacle. Obstacle data (e.g. height, length and width) of an obstacle, and its GPS coordinates, may be stored in a database of the system (not shown), and queried by the camera management module 120. The camera management module 120 then may process the obstacle data to compute if the field of view of the camera is impeded by the obstacle, such that the object of interest, based on its position data, is outside the field of view of the camera.

Figure 6:
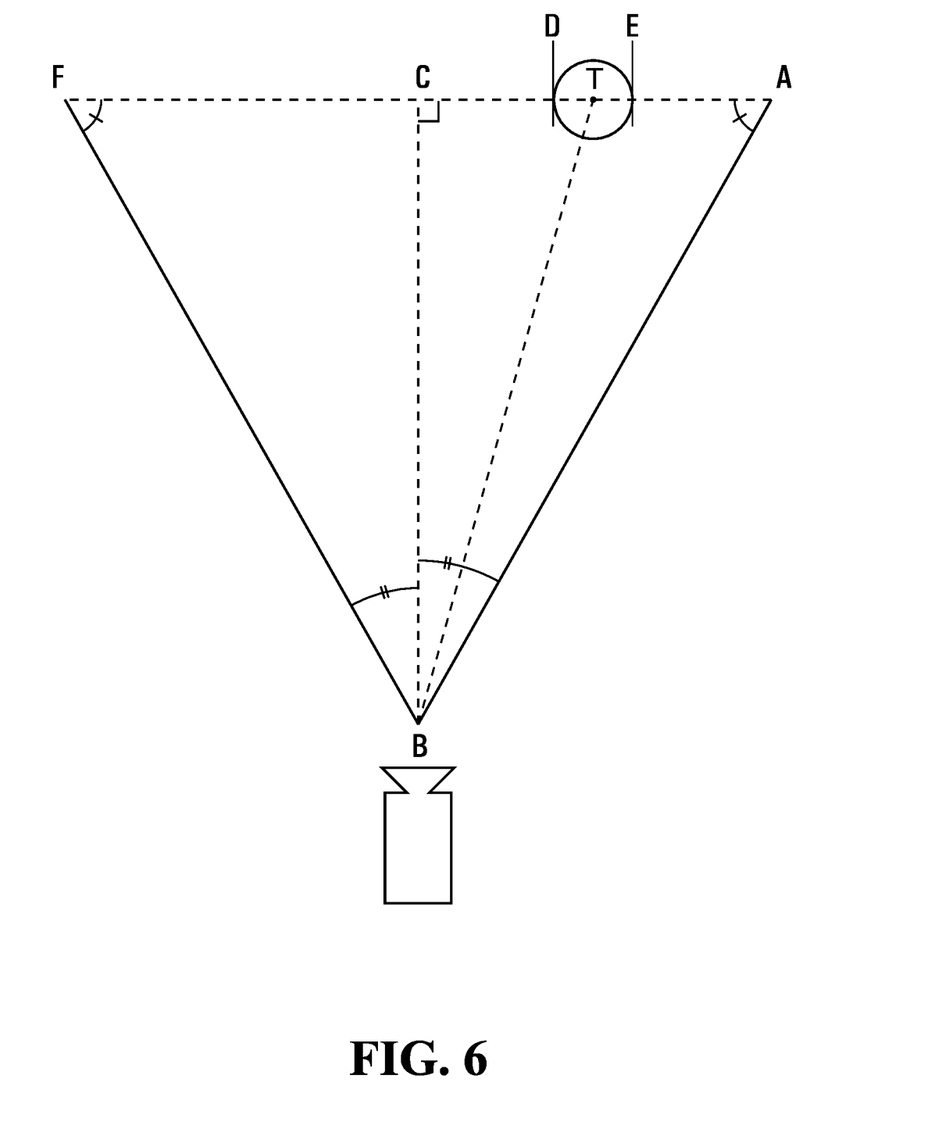
FIG. 6 is a drawing of the field of view of an exemplary camera capturing a decentered object of interest.

For instance, for each camera of the set of cameras, the camera management module 120 may perform the following exemplary steps to determine which camera resource 150 of the set of cameras may capture the object (reference is made to FIG. 6 for distance representations):

The camera management module 120 determines if the object of interest is closer to the camera than the maximum distance (or maximum depth) of the camera:
Calculate the longitudinal distance BC between the object and the camera from the position data of the camera and the position data of the object of interest;
Compare BC with the camera's maximum distance;
If BC≤max depth, then a value is set to positive for the camera indicative that the camera meets the maximum distance requirement;

The camera management module 120 determines if the object of interest is within the maximum field of view of the camera:
from the orientation data of the camera, the max field of view data of the camera (and in some examples, the height of the camera with respect to the ground), determine the maximum and oriented field of view of the camera;
calculate distance CT (lateral distance between the center of the camera's field of view and the object) from the position data of the camera, the position data of the object of interest, and the maximum and oriented field of view of the camera;
compare CT with the camera's maximum field of view;

if CT≤½ maxFOV, then a value is set to positive for the camera indicative that the camera meets the maximum field of view requirement;

If would be understood that other exemplary calculations and/or steps may be performed by the camera management module 120 to determine if the camera can capture the object of interest.

In some embodiments, the camera management module 120 may also consider the height of the camera resource 150 in relation with the camera's vertical pan in order to determine if the object is inside the field of view of the camera resource 150. Additionally, the camera management module 120 may further consider the tilt of the camera resource 150 with regards to the object of interest to ensure its presence in the camera's field of view.

By verifying if the camera can capture the object of interest at the maximum field of view of the camera (and, in some examples, by ensuring that the object is less than the maximum distance of the camera), the camera management module 120 selects a subset of cameras from the set of cameras at step 350.

The camera management module 120 then transmits information on each camera of the selected subset of cameras to the zoom module 140 at step 360. For instance, the camera management module 120 may verify if the values are set to positive for respectively the maximum distance requirement and the maximum field of view requirement. If such is the case, then the camera identification, and/or the camera data structure are transmitted by the camera management module 120 to the zoom module 140.

The camera management module 120 may also transmit the object data and the position data of the object of interest to the zoom module 140.

The camera management module 120 may also call the zoom module 140 at step 370.

The Zoom Module 140:

The zoom module 140 calculates the zoom factor for each camera resource 150 of the subset of cameras selected by the camera management module 120 such that the camera is maximally zoomed-in while still capturing the entirety of the object of interest. Moreover, the zoom module 140 also generates and transmits the corresponding zoom commands to the cameras.

Figure 5:
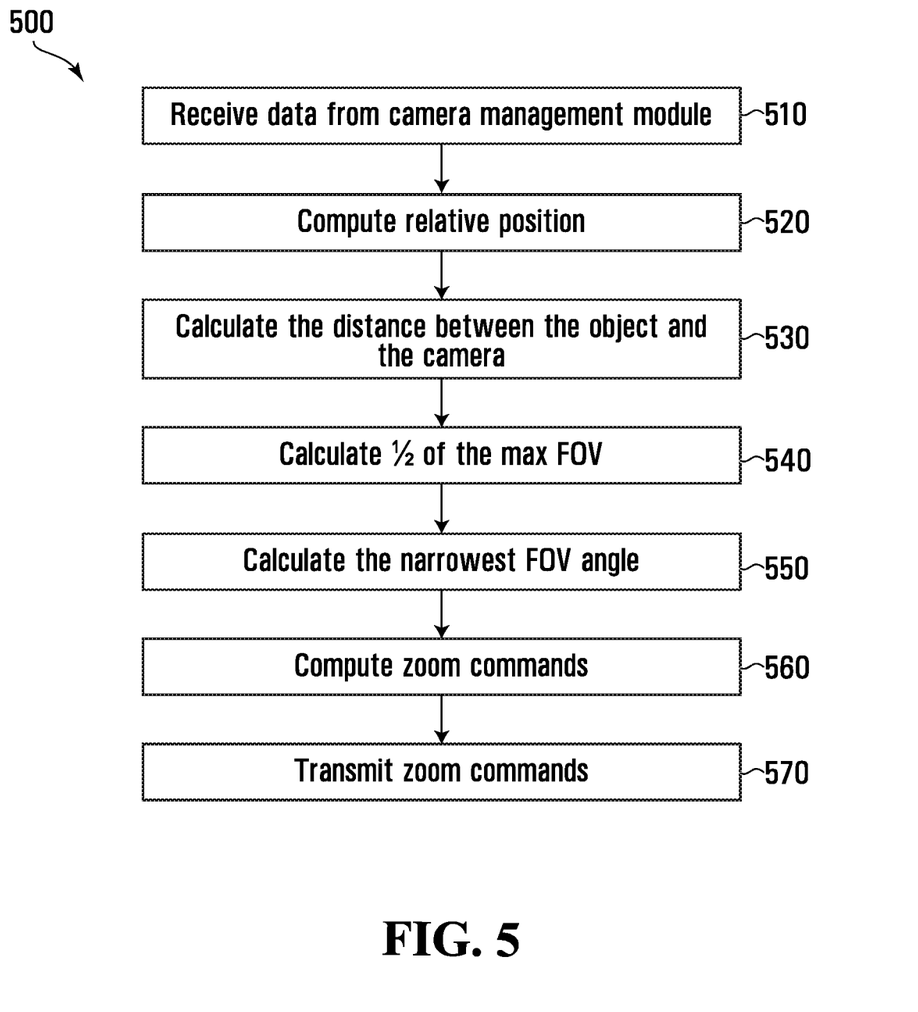
FIG. 5 is a flowchart diagram of an exemplary set of steps for calculating and transmitting zoom commands to cameras by an exemplary zoom module stored in memory and executed by a processor of an exemplary surveillance system.

Reference is now made to FIG. 5, illustrating an exemplary set of steps 500 carried out by the program code of a zoom module (e.g. zoom module 140) when executed by a processor of the system 100. For purposes of illustration, reference will be made to the zoom module 140 of the system 100 of FIG. 2.

The zoom module 140 receives from the camera management module 120 the position data and the object data of the object of interest, and camera IDs and/or the relevant information of the selected subset of cameras (e.g. as camera data structures for each selected camera) from the camera management module 120 at step 510.

Figure 4:
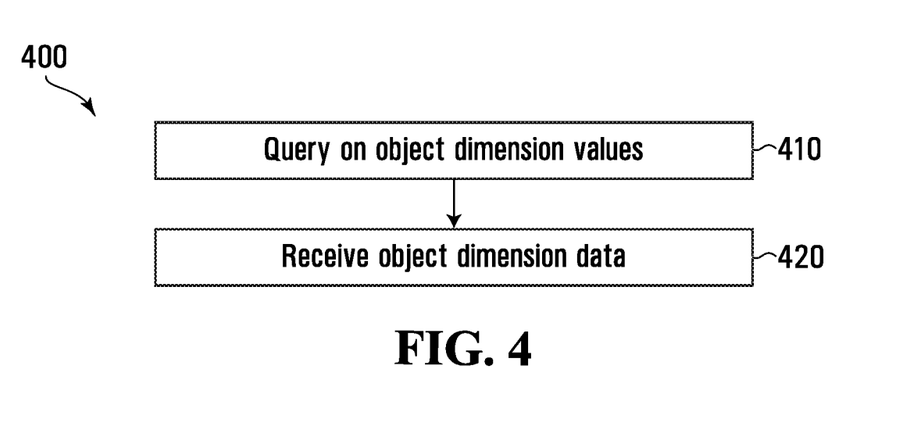
FIG. 4 is a flowchart diagram of an exemplary set of steps for calculating the relative position of an object of interest with regards to a camera by an exemplary position module stored in memory and executed by a processor of an exemplary surveillance system.

In some embodiments, the object data received by the zoom module 140 may consist of an identification of a type of object without including the object's dimensions. In such examples, reference is made to FIG. 4, illustrating an exemplary set of steps 400 carried out by the program code of a zoom module (e.g. zoom module 140) when executed by a processor of the system 100 to obtain dimensions of the object of interest in view of the object type value transmitted as at least part of the object data of the object of interest by the camera management module 120.

The zoom module 140 may first verify if the object data includes values for the dimensions of the object of interest.

If the object data does not contain values for the dimensions of the object of interest, the zoom module 140 may then determine if the object data includes a value for the object type of the object of interest (e.g. by analyzing the metadata of the object data). The zoom module 140 may then retrieve the value for the object type. For instance, the object type may be <VAN>.

The zoom module 140 may then query an object database 101b (internal or external) for pre-set dimension data associated with the identified object type 503 at step 410. For instance, in the same example, the zoom module 140 may query the database 101b for dimension values (e.g. length, width, and/or height) associated with the value <VAN>. The database 101b may contain values (i.e. in a unit of measurement) for pre-set default dimensions associated to each object type value.

The dimension values are then retrieved from the database 101b by the zoom module 140 at step 420. The dimension values may then be further processed by the zoom module 140 to calculate the zoom factor as described herein.

Returning to FIG. 5, the zoom module 140 performs steps 520 to 570 for each of the cameras of the subset of selected cameras.

The zoom module 140 then calculates the relative position of the object of interest with respect to the center of the field of view of the camera at step 520.

The relative position of the object of interest is a value related to the position of the object with respect to the center or central axis of the field of view. This value is important for z-cameras where the z-camera cannot adjust its pan or tilt to center the field of view of the camera with respect to the object of interest. As such, the object of interest may not be centered with respect to field of view of the z-camera, but the z-camera may nevertheless provide valuable information in the form of an image stream or a set of images of the object of interest, where the zoom module 140 generates zoom commands to maximize the size of the image of the object of interest, despite the object of interest not necessarily being centered in the field of view of the z-camera.

For instance, the value for the relative position of the object of interest may be an angle defined by the segment connecting the points representing the position of the camera to the position of the object of interest, and the segment that is the central axis of the field of view. With reference to the diagram of FIG. 6, the value of the relative position of the object of interest may be the angle CBT.

It will be understood that the value for the relative position of the object of interest may be other than angle CBT without departing from the present teachings, provided that the value is related to the position of the object with respect to the center or central axis of the field of view (e.g. with reference to FIG. 6, fraction of CT/CA).

The zoom module 140 then may calculate a value for the distance between the camera and the object of interest from the position data of the object of interest and the position data of the camera at step 530. In some examples, the distance between the camera and the object of interest may also take into account the height value of the camera. In some examples, the distance between the camera and the object of interest may be transmitted by the camera management module 120 to the zoom module 140.

For instance, the value of the distance between the camera and the object of interest may be calculated from the GPS coordinates of the camera and the GPS coordinates of the object of interest. In some embodiments, the value of the distance between the camera and the object of interest is a real-space distance.

The zoom module 140 then calculates half of the max field of view of the camera at step 540. The max field of view may be defined as a value corresponding to an angle of the camera. For instance, with reference to FIG. 6, the max field of view angle corresponds to angle FBA, and wherein half of the max field of view angle is angle CBA. In one example, if the max field of view angle corresponds to 100°, then the value for half the field of view angle is 50°.

The zoom module 140 may then calculate the narrowest field of view angle that would still allow the camera resource 150 to capture all of the object of interest at step 550. An exemplary calculation of the narrowest field of view angle is provided hereafter, with reference made to FIG. 6 for distance representations.

The narrowest field of view is defined as the angle of the field of view of the camera when the camera is maximally zoomed to capture the entire object of interest while minimizing the image around the object of interest (e.g. the minimization of distance EA).

Angle CTB is then calculated by the zoom module 140, where angle CTB=180−(90+angle CBT).

Distance BC is then calculated by the zoom module 140, where distance BC=distance BT cos (angle CBT).

The zoom module 140 then calculates distance CT=square root of (distance $TB^2$−distance $BC^2$).

The zoom module 140 then calculates the distance from the center of the field of view of the camera to the distal edge of the object of interest, equivalent to CE, where CE=CT+½ of DE (where the value of DE is obtained from the object data of the object of interest, defining the dimensions of the object of interest).

The narrowest field of view angle is equal to 2*CBE, or 2*($\tan^{-1}$ (distance CE/distance CB).

In some examples, a margin surrounding the object of interest may be defined (e.g. as a default setting by the system 100, configured by a user, etc.) The margin allows for the camera to also capture contextual information surrounding the object of interest.

For instance, making reference to FIG. 2, a client computer device 250 may define a minimum margin to be used by the zoom module 140 to compute the zoom factor. In this case, the client computer device 250 may communicate this information to the input/output interface 110 is considered by the zoom module 140. It will be appreciated that a user defined margin is optional and, should no margin be input, the zoom module 140 may use a predefined default value.

When a margin is provided, the zoom module 140 may increase the dimension values of the object of interest based on the margin values, the zoom module 140 then performing the calculation of the narrowest field of view value based on the increased dimensions of the object of interest with the margin values.

It will be understood, by someone skilled in the art, that the aforementioned calculations are only representative of narrowest field of view calculations made in one plane and may be expanded to include limitations to zoom from other planes. Such additional limitations may stem from the tilt of the camera, the height at which the camera is fixed with regard to its vertical pan, or any other limitations.

In other examples, where the height of the camera is considered in the calculations performed by the zoom module 140, the same calculations as described herein with respect to FIG. 6 may be performed, albeit the field of view, and the values related thereto, is defined as a function of x, y and z (i.e. the plane of the field of view is non-parallel or tilted with respect to the ground).

Once the narrowest field of view has been calculated by the zoom module 140, the zoom module 140 calculates the zoom level or zoom factor of the camera for the narrowest field of view. For instance, the zoom factor may be related to the Max field of view angle of the camera divided by the narrowest field of view angle.

The zoom factor may be translated to zoom commands by the zoom module 140 (with or without the current zoom settings of the camera) at step 560. Each of the zoom commands may be associated with a given address for the camera such that the zoom commands may be communicated to the camera resource 150 via network 200.

The zoom commands are then transmitted by the zoom module 140 to the input/output interface 110 at step 570. The zoom commands are then relayed to the relevant camera resource 150 corresponding to the address associated with the zoom commands.

The client computer device 250 may then receive the optimally zoomed-in data stream of the object of interest from the one or more camera resources 150 that are capable of capturing the object of interest.

Figure 10:
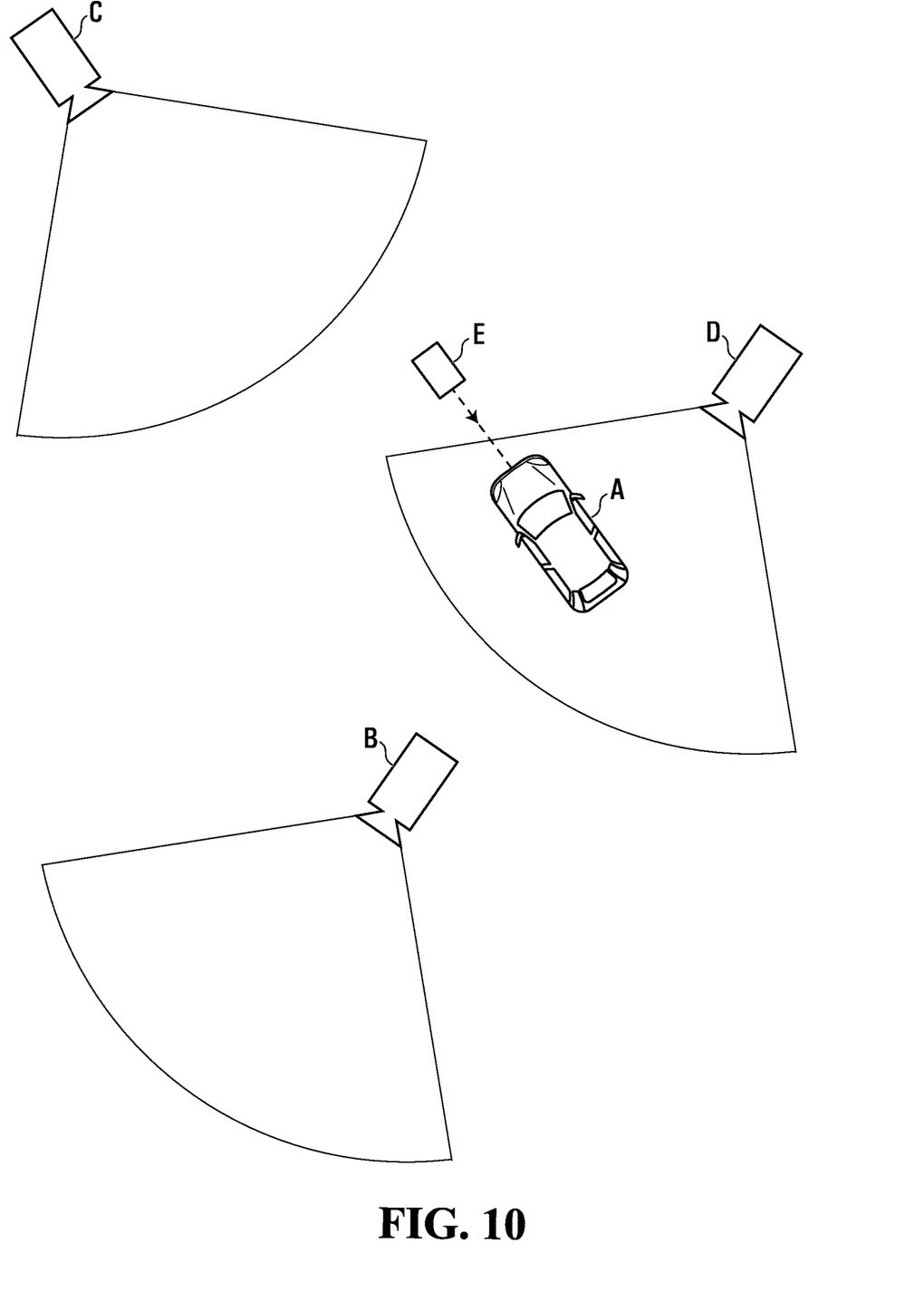
FIG. 10 is a drawing of a top-down representation of an exemplary set of cameras controllable by an exemplary system for controlling cameras, the field of views of the cameras, and an exemplary object of interest.

Example of the Use of Exemplary System 100:

Reference will now be made to an example of the use of exemplary system 100 as illustrated in FIG. 10.

An LPR camera E may capture the license plate of a vehicle A. The LPR may process the license plate and determine that the license plate is associated with a Toyota Camri™. The system 100 may receive from the LPR camera E the GPS coordinates of the Toyota Camri and as object data the object type value of the object of interest as <CAR> or the dimensions of the car (e.g. obtained from the web or from the LPR camera as standard dimensions for a Toyota Camri).

The camera management module 120 determines which cameras in the vicinity of Toyota Camri can capture the Toyota Camri. For instance, Z-camera B does not have the proper orientation and is facing away from the Toyota Camri. The field of view value for z-camera B may be set to negative by the camera management module 120. Camera B is not selected by the camera management module 120.

The Z-camera C may have the proper orientation, but the camera management module 120 determines that the position of the vehicle A is further than the maximum field of view of the z-camera C. The maximum distance value for z-camera C may be set to negative by the camera management module 120. Camera C is not selected by the camera management module 120.

The camera management module 120 determines that the Z-camera D has a maximum field of view that can capture vehicle A and that the distance between vehicle A and the position of z-camera D is less than the maximum distance of z-camera D as described herein. The maximum distance value and the field of view value for camera D are both set to positive.

The zoom module 140 is then called to calculate the narrowest field of view angle the z-camera D such that it captures vehicle A.

The zoom module 140 first calculates a relative position value for vehicle A with respect to the center of the field of view of z-camera D; this value is not zero as vehicle A is not centered with respect to the field of view of the z-camera D.

From the dimensions of vehicle A, the GPS coordinates of vehicle A, the GPS coordinates of z-camera D (and in some examples, the height of z-camera D with respect to the ground), the zoom module 140 calculates the narrowest field of view angle as explained herein.

The zoom factor is calculated by the zoom module 140 from the narrowest field of view value.

The zoom commands are generated by the zoom module 140 as a function of the zoom factor.

The zoom commands are transmitted by the system 100 to the Z-camera D (e.g. via network 200).

Z-camera D receives and processes the zoom commands, causing the zoom of z-camera D to increase such that z-camera increases the space taken by vehicle A in the image to a point immediately prior to losing a part of vehicle A (provided that no margins around vehicle A have been set as explained herein), vehicle A maintained within the field of view of z-camera D.

Aspects of the present disclosure may be implemented using hardware, software, executed by a processor, or a combination thereof and may be implemented in one or more computer systems. In an aspect of the present disclosure, various features may be directed toward one or more computer systems capable of carrying out the functionality described therein. An example of a computer system may be the one illustrated in FIG. 9.

Figure 9:
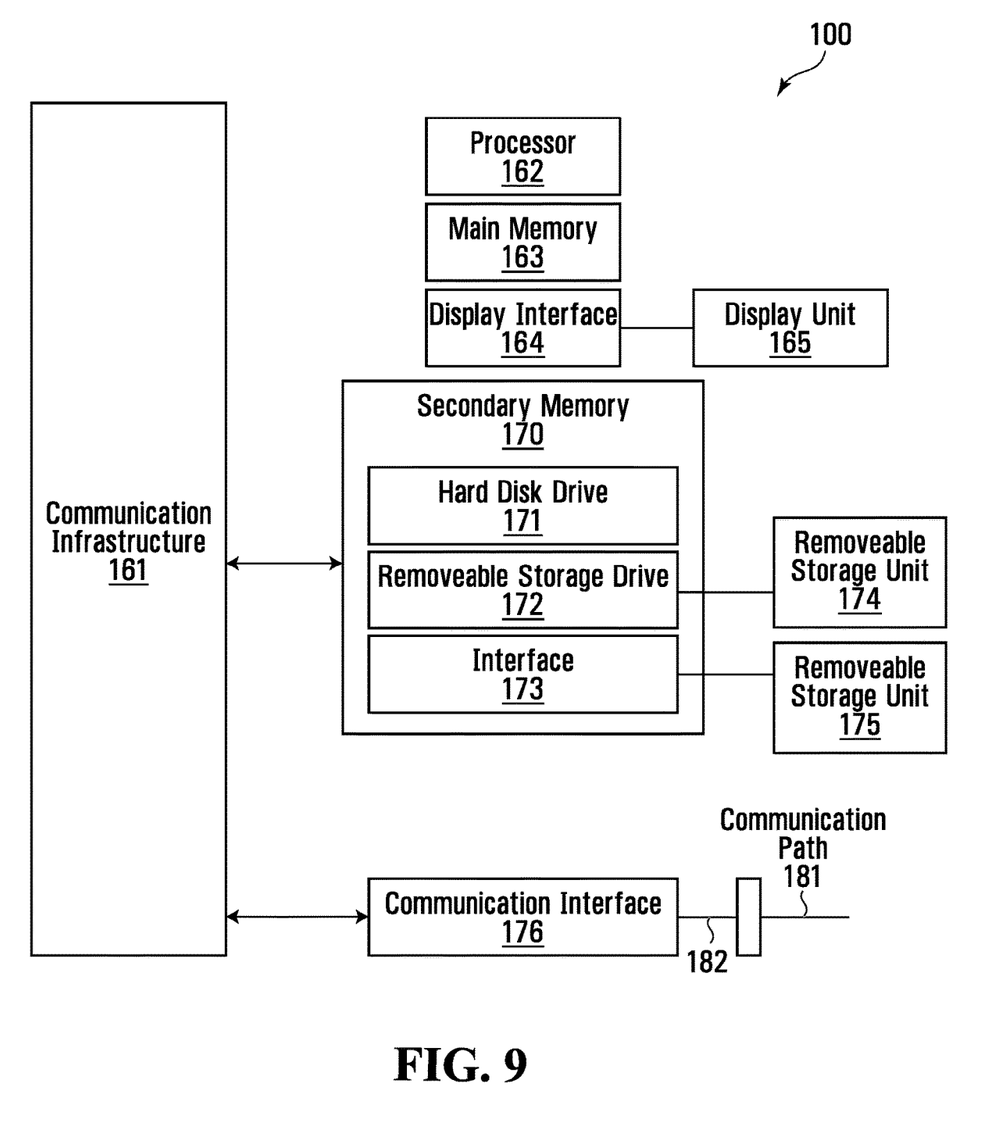
FIG. 9 is a block diagram of various features of an exemplary computer system for use with aspects of the present disclosure.

The system 100 includes one or more processors, such as processor 162. The processor 162 is coupled to a communication infrastructure 161 (e.g. a communications bus, cross-over bar, network, etc.). However, it will be apparent to a person of ordinary skill in the art how to implement aspects hereof using other computer systems and/or architectures.

The system 100 may include a display interface 164 that forwards graphics, text, and other data from the communication infrastructure 161 (or from a frame buffer, not shown) for display on a display unit 165. The surveillance system 100 may include a main memory 163 (e.g. random access memory—RAM), and may also include secondary memory 170. The secondary memory 170 may include, for example, a hard disk drive 171 and/or a removable storage drive 172, e.g., optical disk drive. The removable storage drive 172 may read from and/or write to a removable storage unit 174. The removable storage unit 174 may include a computer readable storage medium having stored therein computer software and/or data.

Alternative aspects of the present disclosure may include secondary memory 170 and may include other similar devices for allowing computer programs or other instructions to be loaded into the system 100. These devices may include, for instance, a removable storage unit 175 and an interface 173. Examples of such may include, for instance, a removable memory chip (such as an erasable programmable read only memory (EPROM), or programmable read only memory (PROM)) and its associated socket, and other removable storage units 175 and its interface 173, which allow software and data to be transferred from the removable storage unit 175 to the surveillance system 100.

The surveillance system 100 may also include a communications interface 176. The communication interface 176 may allow software and data to be transferred among the system 100 and external devices. Examples of communication interface 176 may include, but are not limited to, a modem, a network interface (such as an Ethernet card), a communications port, a Personal Computer Memory Card International Association (PCMCIA) slot and card, etc. Software and data transferred via communications interface 176 may be in the form of signals 182, which may be electronic, electromagnetic, optical and other signals capable of being received by communications interface 176. These signals 182 may be provided to communications interface 176 via a communications path (e.g. channel) 181.

This communications path 181 may carry signals and may be implemented using wire or cable, fibre optics, a telephone line, a cellular link, a radio frequency (RF) link and/or other communications channels. As used herein, the terms "computer readable medium", "computer program medium", and "computer usable medium" refer generally to media such as a removable storage drive 172, and/or a hard disk installed in the hard disk drive 171.

Computer programs and/or data may be stored in main memory 163 and/or secondary memory 170. Computer programs and/or data may also be received via communications interface 176. Such computer programs, when executed, may enable the system 100 to perform the features in accordance with aspects of the present disclosure as discussed herein. In particular, the computer programs, when executed, may enable the processor 162 to perform the features in accordance with aspects of the present disclosure. Accordingly, such computer programs may represent controllers of the system 100.

Where aspects of the present disclosure may be implemented using software, the software may be stored in a computer program produced and loaded into the system 100 using removable storage drive 172, hard disk drive 171, or interface 173. The control logic (software), when executed by processor 162, may cause the processor 162 to perform the functions described herein. In another aspect of the present disclosure, the system may be implemented primarily in hardware using, for example, hardware components, such as application specific integrated circuits (ASICs). Implementation of the hardware state machine so as to perform the functions described herein will be apparent to persons of ordinary skill in the art. In yet another variation of the present disclosure, aspects of the present disclosure may be implemented using a combination of both hardware and software.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of controlling one or more z-cameras which have adjustable zoom but which do not have adjustable pan and tilt, from a set of cameras, to obtain image streams capturing an object of interest, the method comprising:

receiving position data and object data corresponding to the object of interest, the position data related or relatable to a position of the object of interest and object data includes or is relatable to dimension information on the object of interest;

determining from at least position data of the one or more z-cameras having fixed pan and fixed tilt, the position data of the object of interest, the object data of the object of interest and a fixed orientation of each of the one or more z-cameras, a subset of the one or more z-cameras having a zone of potential coverage comprising the object of interest;

for each z-camera of the subset of the one or more z-cameras, computing a perpendicular distance of the object of interest with respect to a central axis of the field of view of each said z-camera of the subset of the one or more z-cameras;

for at least one z-camera of the subset of the one or more z-cameras, computing a zoom factor calculated by determining a narrowest field of view angle of said at least one z-camera that encompasses the object of interest as determined from at least the position data, the dimension information, and the computed perpendicular distance of the object of interest with respect to the central axis of the field of view of said at least one z-camera; and generating transmission commands for the subset of the one or more z-cameras based on the computed zoom factor.

2. The method as defined in claim 1, wherein the object data includes dimension information that defines the dimensions of the object of interest.

3. The method as defined in claim 1, wherein the object data is relatable to dimension information, the object data comprising object type information that is associated to pre-defined dimension information for the object type.

4. The method as defined in claim 1, wherein the orientation of the each of the one or more z-cameras comprises a pan and a tilt of the z-camera.

5. The method as defined in claim 1, wherein the narrowest field of view angle of said at least one z-camera is determined from at least the position data, the dimension information, the computed perpendicular distance of the object of interest with respect to the central axis of the field of view of said at least one z-camera and the height of said at least one z-camera from the ground.

6. The method as defined in claim 1, wherein object margin information is provided that defines object margins for the object of interest, and wherein the narrowest field of view of said at least one z-camera is determined from at least the position data, the dimension information, the computed perpendicular distance of the object of interest with respect to the central axis of the field of view of said at least one z-camera and the object margin information, wherein the narrowest field of view angle is a field of view angle that enables said at least one z-camera to capture the object of interest and the object margins.

7. The method as defined in claim 1, wherein the subset of the one or more z-cameras having a zone of potential coverage comprising the object of interest is determined from at least the position data of the one or more z-cameras, the position data of the object of interest, the object data of the object of interest, the orientation of each of the one or more z-cameras and a maximum distance at which the one or more z-cameras can view an object.

8. The method as defined in claim 1, wherein the position data comprises GPS coordinates.

9. The method as defined in claim 1, further comprising verifying based on the position data of the one or more z-cameras, that each of the one or more z-cameras is positioned within a defined territory.

10. The method as defined in claim 1, wherein the determining a subset of the one or more z-cameras having a zone of potential coverage comprises retrieving from memory, for each of the one or more z-cameras, the maximum field of view and the maximum distance of the each of the one or more z-cameras.

11. The method as defined in claim 1, wherein the narrowest field of view angle is determined from at least a distance of said at least one z-camera of the subset of the one or more z-cameras to the object of interest based on the object data, the maximum field of view angle of said at least one z-camera of the subset of the one or more z-cameras and the perpendicular distance of the object of interest with respect to the central axis of the field of view of said at least one z-camera.

12. A system for controlling one or more z-cameras which have adjustable zoom but which do not have adjustable pan and tilt, from a set of cameras, to obtain image streams capturing an object of interest, the system comprising:
   memory to store data and instructions;
   a processor in communication with the memory; and
   a computer-readable camera zoom controlling application accessible via the memory and the processor, wherein the camera zoom controlling application is operable to:
   receive position data and object data corresponding to the object of interest, the position data related or relatable to a position of the object of interest and object data includes or is relatable to dimension information on the object of interest;
   determine from at least position data of the one or more z-cameras having fixed pan and fixed tilt, the position data of the object of interest, the object data of the object of interest and a fixed orientation of each of the one or more z-cameras, a subset of the one or more z-cameras having a zone of potential coverage comprising the object of interest;
   for each z-camera of the subset of the one or more z-cameras, compute a perpendicular distance of the object of interest with respect to a central axis of the field of view of each said z-camera of the subset of one or more z-cameras;
   for at least one z-camera of the subset of the one or more z-cameras, compute a zoom factor calculated by determining a narrowest field of view angle of said at least one z-camera that encompasses the object of interest as determined from at least the position data, the dimension information and the computed perpendicular distance of the object of interest with respect to the central axis of the field of view of said at least one z-camera; and
   generate transmission commands for the subset of the one or more z-cameras based on the computed zoom factor.

13. A non-transitory computer-readable medium storing instructions executable by a computer device, comprising:
   at least one instruction for causing the computer device to receive position data and object data corresponding to the object of interest, the position data related or relatable to a position of the object of interest and object data includes or is relatable to dimension information on the object of interest;
   at least one instruction for causing the computer device to determine from at least position data of the one or more z-cameras having fixed pan and fixed tilt, the position data of the object of interest, the object data of the object of interest and a fixed orientation of each of the one or more z-cameras, a subset of the one or more z-cameras having a zone of potential coverage comprising the object of interest;
   at least one instruction for causing the computer device to, for each z-camera of the subset of the one or more z-cameras, compute a perpendicular distance of the object of interest with respect to a central axis of the field of view of each said z-camera of the subset of the one or more z-cameras;
   at least one instruction for causing the computer device to, for at least one z-camera of the subset of the one or more z-cameras, compute a zoom factor calculated by determining a narrowest field of view angle of said at least one z-camera that encompasses the object of interest as determined from at least the position data, the dimension information and the computed perpendicular distance of the object of interest with respect to the central axis of the field of view of said at least one z-camera; and
   at least one instruction for causing the computer device to generate transmission commands for the subset of the one or more z-cameras based on the computed zoom factor.

* * * * *